United States Patent [19]

Briccetti

[11] Patent Number: 4,493,194
[45] Date of Patent: Jan. 15, 1985

[54] APPARATUS FOR CONTROLLING THE OPERATION OF AN INDOOR FAN ASSOCIATED WITH AN AIR CONDITIONING UNIT

[75] Inventor: Mario F. Briccetti, Liverpool, N.Y.

[73] Assignee: Carrier Corporation, Syracuse, N.Y.

[21] Appl. No.: 553,619

[22] Filed: Nov. 21, 1983

Related U.S. Application Data

[62] Division of Ser. No. 362,789, Mar. 29, 1982, Pat. No. 4,449,375.

[51] Int. Cl.³ .............................................. F25D 17/06
[52] U.S. Cl. .......................................... 62/180; 62/186
[58] Field of Search ................... 62/180, 186, 160, 89; 236/49, DIG. 9; 165/16; 364/557

[56] References Cited

U.S. PATENT DOCUMENTS 4,266,599  5/1981  Saunders et al. ............... 62/157 X
4,307,775  12/1981  Saunders et al. ............... 165/11 R Primary Examiner—Harry Tanner
Attorney, Agent, or Firm—Robert H. Kelly

[57] ABSTRACT

A method of operating an air conditioning system including a refrigeration circuit having a compressor and a thermostat for sensing heating and cooling needs together with an indoor fan is disclosed. The indoor fan operation is controlled based upon a microprocessor control remembering whether or not the unit was in continuous fan operation prior to the compressor operating to satisfy a heating or cooling need. Through the setting of a flag the microprocessor remembers the previous inputs such that operation of the fan may be controlled regardless of the condition of the compressor especially as concerns operation of the fan when the compressor is prevented from operating due to a safety, overload or timed off condition.

8 Claims, 4 Drawing Figures

APPARATUS FOR CONTROLLING THE OPERATION OF AN INDOOR FAN ASSOCIATED WITH AN AIR CONDITIONING UNIT

This application is a division of application Ser. No. 362,789, filed 3/29/82, now U.S. Pat. No. 4,449,375.

BACKGROUND OF THE INVENTION

1. Field of the Invention

The present invention relates to an air conditioning system including an indoor heat exchanger as part of a refrigeration circuit. More specifically, the present invention concerns a method for controlling an indoor fan located to circulate air from an enclosure through the indoor heat exchanger of the refrigeration circuit and back to the enclosure. A fan control is provided for allowing an operator to select continuous fan operation in which the fan is operated continuously or automatic operation in which the fan is operated together with a compressor of the refrigeration circuit.

2. Description of the Prior Art

Air conditioning systems, including straight cooling systems and heat pumps, typically have a thermostat located in the space to be conditioned to determine whether the enclosure temperature is too high or too low. Upon sensing a temperature variation from the desired range a thermal sensing element typically closes indicative that air conditioning, either heating or cooling, is necessary. Additionally, some thermostats include a fan control switch therewith such that the fan may be operated either independently from the refrigeration circuit or in conjunction with the refrigeration circuit.

Thermostats incorporating a switch between automatic and continuous on control are known in the art. A brief description of one may be found in U.S. Pat. No. 4,178,988 issued to the assignee hereof and disclosing therein a thermostat for the control of a combination furnace and heat pump.

In the present application a microprocessor control is utilized in conjunction with this thermostat to control the operation of the air conditioning system including the operation of the indoor fan as well as the compressor of the refrigeration circuit. A central processing unit of the microprocessor control receives signals from the thermostat indicating certain functions. A first signal is received when it is desired to operate the compressor either in the cooling or heating modes of operation. The second signal is received when it is desired to operate the fan. When a heating or cooling cycle is completed the microprocessor control will at that point detect whether or not the second signal is still being generated and based thereon determine whether or not to operate the fan continuously.

In most refrigeration systems there are various overloads and safeties provided to prevent operation of the compressor under certain operating conditions. Safety conditions such as high pressure or low pressure in the refrigeration circuit as well as electrical conditions such as ground fault, welded contacts or timing devices such as an interrupt device to prevent short cycling of the compressor are utilized to prevent the compressor from operating notwithstanding a first signal being generated through the thermostat calling for compressor operation. In order to effectively control the operation of the compressor and the indoor fan it has been found advantageous to determine firstly whether or not a signal is being generated to indicate a demand for compressor operation. Thereafter, it may be determined whether or not the compressor is actually operating or if it is tripped off on a safety. If the compressor is tripped off on a safety then, absent other considerations, the indoor fan will not operate notwithstanding that it may have been manually set in the continuous position. The herein invention provides a method of assuring that notwithstanding the signals sensed if there is demand for compressor operation and the compressor is not operating that there will be available a method for operating the fan continuously.

The control as described acts to remember the state of the second output by setting a flag. At a later point it can be determined whether or not this flag is set and based upon the indication of the flag, the fan may be operated continuously notwithstanding the compressor not operating.

SUMMARY OF THE INVENTION

It is an object of the present invention to provide a control for use with an air conditioning system.

A more specific object of the present invention is to provide a method of operating the indoor fan of an air conditioning system.

It is a further object of the present invention to provide a method of operation of an indoor fan of an air conditioning system wherein the indoor fan may be operated continuously notwithstanding the failure of the compressor to operate based on a demand sensed by the indoor thermostat.

It is a further object of the present invention to provide a control method of operating an indoor fan continuously when the compressor of the air conditioning system is cycled off by a safety or overload.

It is another object of the present invention to provide a safe, economical and efficient means of controlling the operation of an indoor fan associated with an air conditioning system.

These and other objects of the present invention are achieved according to a preferred embodiment thereof by providing a method of operating an air conditioning system, said system including a refrigeration circuit having a compressor, a thermostat for sensing a need for heating or cooling including means for selectively operating an indoor fan continuously without regard to the refrigeration circuit, said thermostat supplying a first signal when fan operation is desired and a second signal when compressor operation is desired. The indoor fan is energized in response to the first signal from the thermostat and the compressor is energized in response to the second signal from the thermostat. An indicator is set when the first signal is sensed and the second signal is not sensed. Thereafter, it is determined if the thermostat is supplying a second signal and the compressor is not operating. If this is the case and if it is determined that the indicator is set then the fan is operated continuously. The method of operation further includes clearing the indicator when neither the first signal nor the second signal is sensed as well as de-energizing the indoor fan if the thermostat is supplying a second signal and the compressor is not operating if the indicator is not set.

DESCRIPTION OF THE PREFERRED EMBODIMENT

The apparatus as described herein will refer to a heat pump system for use in a residential building incorporating a microprocessor control.

It is to be understood that although the present method of operation is incorporated within a microprocessor control the same function can be accomplished through mechanical or electromechanical means as well as manually. Utilization of a microprocessor control herein serves many functions in addition to the indoor fan operation as set forth. It is further to be understood that although the present disclosure refers to a heat pump system the utilization of this indoor fan control may be applied to a straight cooling system or to any system where the operation of the compressor and fan need be integrated.

Figure 1:
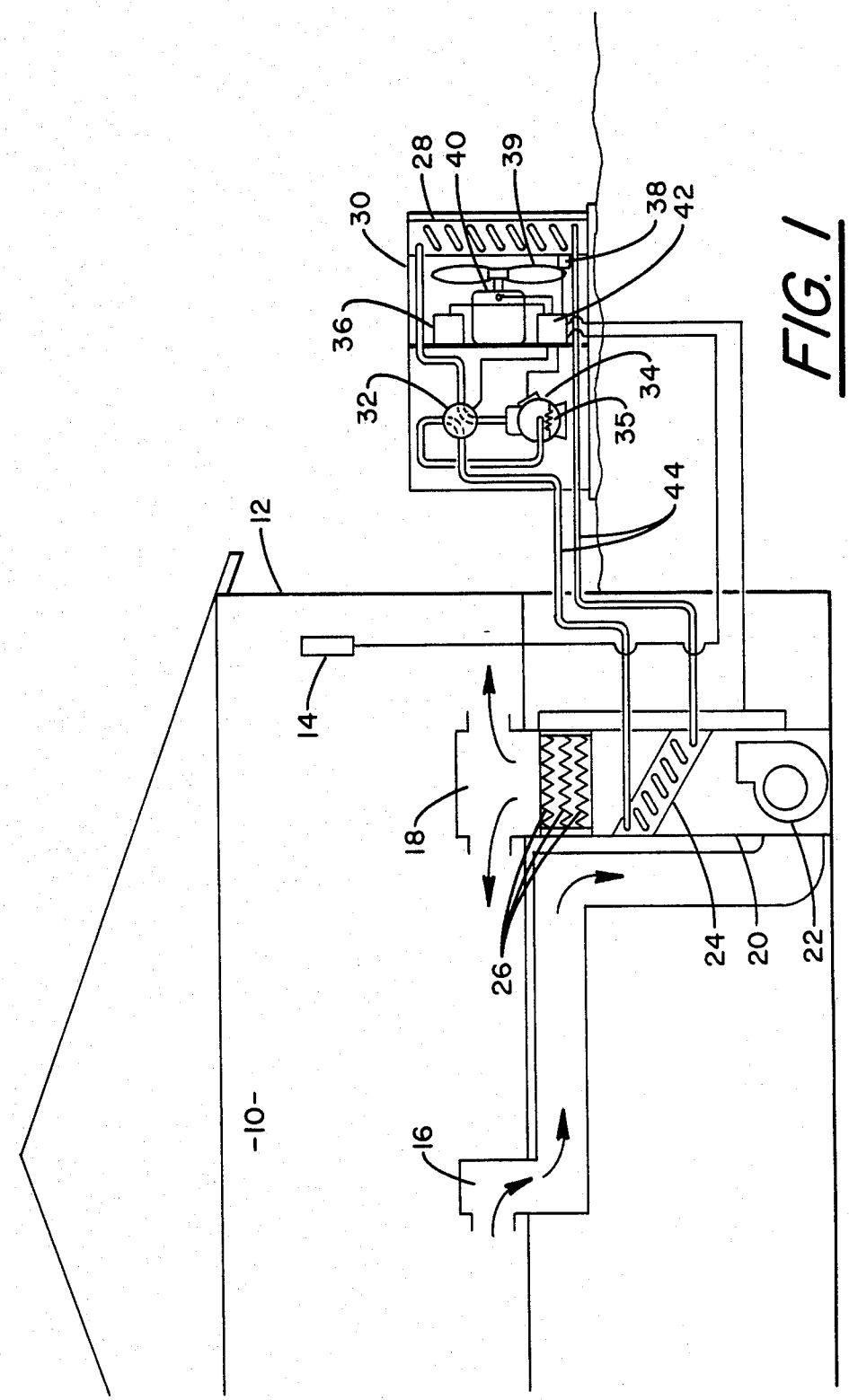
FIG. 1 is a schematic representation of a split heat pump system incorporated into a residential building.

Referring first to FIG. 1 there can be seen a schematic representation of a heat pump system. Residence 10 is shown having fan coil unit 20 located therein for circulating conditioned air within the house. Supply air duct 16 is shown directing air from the enclosure to fan coil unit 20 and return air duct 18 is shown for directing air from the fan coil unit back to the enclosure. Within the fan coil unit 20 may be seen indoor fan 22, indoor heat exchanger 24 and strip heaters 26. Indoor fan 22 acts to circulate the air through the supply duct, through the indoor heat exchanger and strip heaters and back through the return air duct to the enclosure. Indoor heat exchanger 24 is part of a refrigeration circuit and acts to either discharge heat to the air stream directed thereover via indoor fan 22 or to absorb heat energy therefrom. Strip heaters 26 are located downstream from indoor heat exchanger 24 and may be selectively energized to supply heat energy to the air stream flowing through the fan coil unit.

Outdoor unit 30 is shown located exterior of residence 10 and is typically mounted on a pad located adjacent thereto. Within outdoor unit 30 may be seen outdoor coil 28 of the refrigeration circuit, compressor 34 and reversing valve 32. Additionally, there can be seen outdoor fan 39 connected to outdoor fan motor 40 for circulating ambient air over outdoor coil 28. Outdoor temperature sensor 36, outdoor coil temperature senser 38, crankcase heater 35 and control 42 are also indicated to be within the outdoor unit. Likewise, thermostat 14 as well as electrical connections to strip heaters and the indoor fan motor for powering indoor fan 22 are designated.

The refrigeration circuit is made up of indoor coil 24, outdoor coil 28, compressor 34, reversing valve 32 and interconnecting piping 44. Expansion devices for accomplishing pressure drops between the components of the refrigeration circuit are not shown.

During operation of this unit in the heating season, heat energy is absorbed in the outdoor coil 28 acting as an evaporator and discharged to indoor air via indoor heat exchanger 24 serving as a condenser. In the cooling mode of operation the reversing valve is switched such that hot gaseous refrigerant from the compressor is directed first to the outdoor coil 28 then serving as a condenser and then directed to the indoor coil 24 serving as an evaporator for absorbing heat energy from the indoor air.

Figure 2:
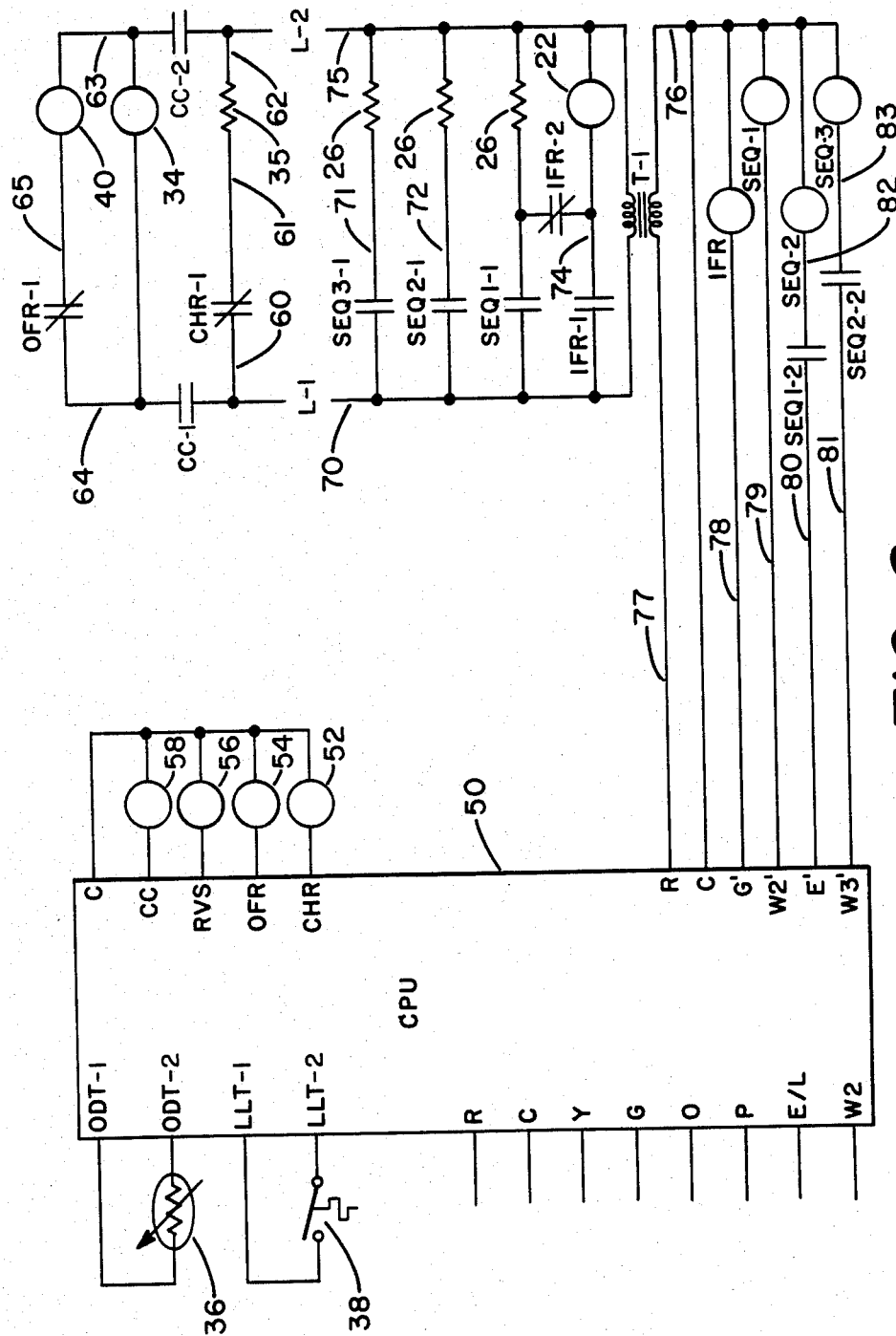
FIG. 2 is a schematic wiring diagram of the controls of the heat pump system.

Referring now to FIG. 2, there can be seen a schematic representation of the control system of this unit. In the left hand portion of FIG. 2 is shown, greatly enlarged, a central processing unit 50. Typically, this would be a microprocessor such as a Mostek 3870. It can be seen that the microprocessor has a plurality of inputs and outputs. Starting from the top left it can be seen that outdoor air temperature sensor 36 is connected through ODT-1 and ODT-2 to the central processing unit. Additionally, outdoor coil temperature sensor 38 is shown connected to the CPU through LLT-1 and LLT-2. Thereafter, a series of eight thermostat inputs labeled R, C, Y, G, 0, P, E/L and W-2 are shown entering the central processor unit. In sequential order, these thermostat inputs are as follows: R—Power to the thermostat from the CPU; C—Common; Y—First stage heating; G—Energize indoor fan relay; O—First stage cooling (reversing valve); P—Power to the central processing unit from the thermostat; E/L—Emergency heat or fault light; W-2—Second stage heat.

On the right hand side of the central processing unit there may be seen connections to various relays. Crankcase heater relay 52, outdoor fan relay 54, reversing valve solenoid relay 56 and compressor contactor 58 are all shown connected to the appropriate compressor, reversing valve solenoid, outdoor fan relay, and crankcase heater relay connections of CPU 50. The CPU is programmed such that upon an appropriate set of inputs being sensed these relays will be energized.

At the bottom right hand side of the central processing unit 50 there are shown six connection points labeled respectively R, C, G', W-2', E' and W-3'. In order, these connections are R—Power, C—Common, G'—Indoor fan relay, W-2'—First stage heat, E'—Second stage heat and W-3'—Third stage heat. As can be seen in FIG. 2, the R connection is connected via wire 77 to one side of transformer T-1. The C connection is connected via wire 76 to the other side of transformer T-1. G' is connected via wire 78 to indoor fan relay IFR. Wire 79 connects W-2' to sequence relay SEQ-1. The E' terminal is connected via wire 80 to first sequence relay contacts SEQ1-2 which are connected by wire 82 to second sequence relay SEQ-2. Contact W-3' is connected via wire 81 to second sequence relay contacts SEQ2-2 which are connected by wire 83 to third sequence relay SEQ-3.

As shown in FIG. 2, lines L-1 and L-2 supply power to the fan coil unit and CPU. Line L-1, designated wire 70, is connected to normally open first sequence relay contacts SEQ1-1, normally open second sequence relay contacts SEQ2-1, to normally open third sequence relay contacts SEQ3-1, to normally open indoor fan relay contacts IFR-1 and to transformer T-1. Line L-2, designated as 75, is connected to heaters H1, H2 and H3, all designated as 26, to transformer T-1 and to indoor fan motor 22. Wire 71 connects normally open third sequence relay contacts SEQ3-1 to heater H3. Wire 72 connects normally open second sequence relay contacts SEQ2-1 to heater H2. Wire 73 connects normally open first sequence relay contacts SEQ1-1 to heater H1 and to normally closed indoor fan relay contacts IFR-2. Wire 74 connects normally open indoor fan relay contacts IFR-1 and normally closed indoor fan relay contacts IFR-2 to indoor fan motor 22.

Power wiring of the outdoor unit may be seen in the top portion of FIG. 2. Therein connected between power lines L-1 and L-2 is wire 60 connected to normally open compressor contacts CC-1 and to normally closed crankcase heater relay contacts CHR-1. Wire 61 connects normally closed crankcase heater relay contacts CHR-1 with crankcase heater CCH (35). Crankcase heater 35 is connected via wire 62 to line L-2 and to normally open compressor contactor contacts CC-2. Wire 64 connects normally open compressor contactor contacts CC-1 to normally closed outdoor fan relay contacts OFR-1 and to compressor motor 34. Wire 65 connects normally closed outdoor fan relay contacts OFR-1 to outdoor fan motor 40. Normally open compressor contactor contacts CC-2 are connected via wire 63 to compressor motor 34 and to outdoor fan motor 40.

Figure 3:
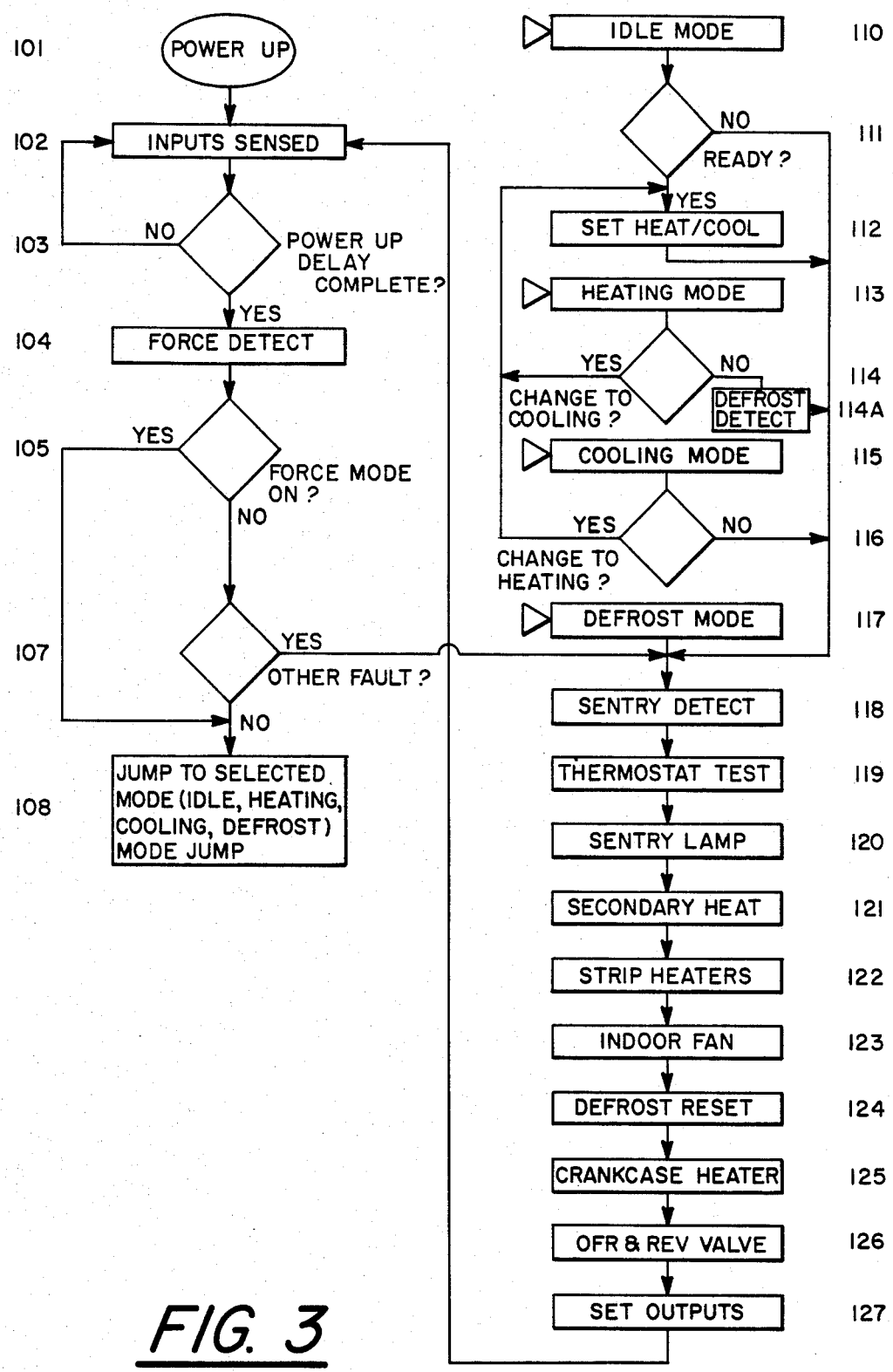
FIG. 3 is a flow diagram of the summary of the operation of the microprocessor control for the heat pump system.

FIG. 3 is a flow chart indicating the overall operation of the control system. It can be seen that the overall system control is obtained by logic flow through a series of logic steps. Each logic step may represent a subroutine or series of steps omitted for clarity in this overall chart. The initial step 101 is the powerup of the unit upon energization. Thereafter at step 102 the various inputs are sensed. To make sure the inputs are stabilized and debounced a powerup delay occurs before proceeding to force detect step 104. If the powerup delay is not complete then there is a reversion to the step of sensing inputs until said delay is accomplished. Force detect, step 104, determines whether or not the compressor is operating it is not supposed to be. This step would detect a condition such as a contactor welded closed energizing the compressor when the various inputs are calling for the compressor to be deenergized. Step 105 determines whether the force mode is detected. If the force mode is detected then the program skips to step 108 wherein the logic jumps to the selected mode. If, in step 105, the force mode is not detected then the logic proceeds to step 107. At step 107 there is a determination whether there is another fault in the system. If there is no other fault the logic proceeds to step 108, the jump to the selected mode, one of the modes of idle, heating, cooling or defrost. If another fault is detected then the control logic jumps to step 118, sentry detect.

If in step 108 the jump is selected to the idle mode then the logic proceeds to step 110. Thereafter, at step 111, a ready determination is made and if the answer is no the logic jumps to step 118 without placing the unit in heating or cooling. If the answer to step 111 is yes the logic proceeds to step 112 and the air conditioning unit is placed in heating or cooling in step 112. The logic then jumps to step 118.

If the jump to the selected mode selects the heating mode then the jump is made to step 113. Once operation is in the heating mode the question of should operation be changed to cooling is continually answered at step 114. If the answer is yes, the logic is cycled back to step 112 of setting the unit in heat or cool and if the answer is no logic operation proceeds to step 114A, defrost detect. If a need for defrost is detected the logic changes the mode from heating to defrost and then jumps to step 118. If a need for defrost is not detected the logic does not change the mode and then jumps to step 118.

If in step 108 the selection is the cooling mode then the logic proceeds to step 115. Step 116 continually questions if operation should be changed to heating. If the answer is yes the control sequence proceeds back to the step 112 of setting the unit for heating or cooling. If the answer is no the logic jumps to step 118.

The fourth mode jump is to the defrost mode, step 117. This step in the logic either continues or cancels the defrost mode of operation. If the jump is made to the defrost mode thereafter the logic proceeds through the entire control sequence. From the defrost mode the control sequence includes the steps of sentry detect 118, thermostat test 119, sentry lamp 120, secondary heat 121, strip heaters 122, indoor fan 123, defrost reset 124, crankcase heater 125, OFR plus REV valve 126 and set outputs 127. From the step of set outputs 127 the control sequence reverts to step of inputs sensed (102).

The sentry detect step acts to check the compressor for low current or for ground fault indication. The thermostat test checks to make sure the inputs from the thermostat are in a legal pattern. The sentry lamp step acts to blink a thermostat lamp to indicate various fault modes. Secondary heat controls the W-2 output from the central process unit. The step of strip heaters 122 control the E' and W-3' outputs from the central processing unit. Indoor fan step 123 controls indoor fan 22. Defrost reset determines when a defrost timer for controlling the length of defrost needs to be reinitialized. Crankcase heater, step 125, acts to control the crankcase heater operation. OFR plus REV valve, step 126, acts to control the outdoor fan relay and the reversing valve relays under the appropriate conditions. Step 127 for setting the outputs turns on and off the central processing unit outputs and detects when the compressor is changing state.

Figure 4:
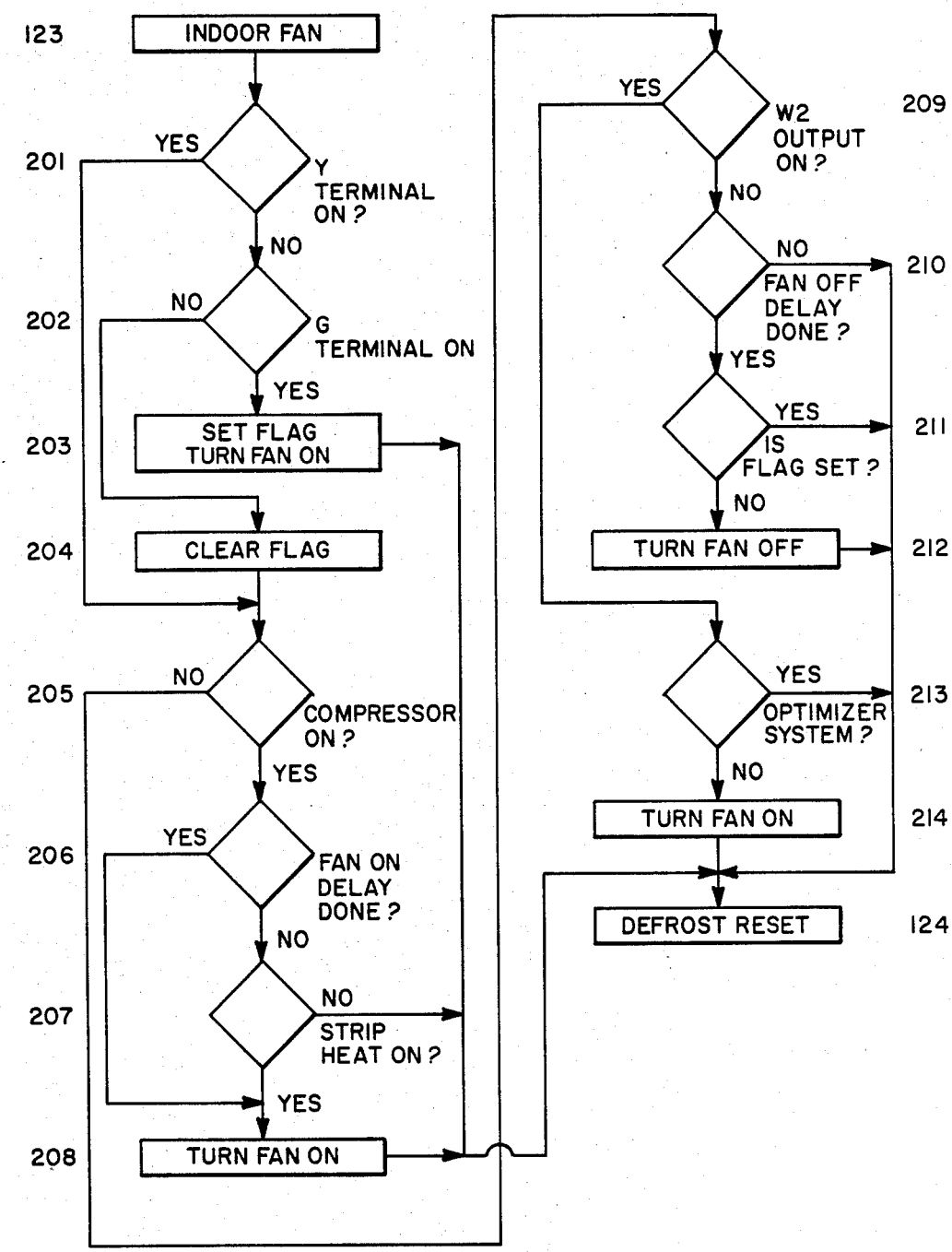
FIG. 4 is a flow chart of the indoor fan control function accomplished by the microprocessor.

Referring more specifically to FIG. 4 there may be seen a flow chart for a specific subroutine to control operation of the indoor fan. Therein it can be seen that indoor fan step 123 is shown having substeps 201 through 214 before proceeding to defrost reset step 126. It can be seen therein that step 201 questions whether the Y terminal into the microprocessor is energized. The Y terminal is the terminal energized by the thermostat upon a first stage heating need or second stage cooling need being sensed. Based upon either of these needs being detected the compressor is typically energized through the microprocessor control. If the Y terminal is not on the logic proceeds to step 202 to determine whether the G terminal is on. The G terminal again is that terminal of the microprocessor control connected to a portion of the thermostat which indicates whether or not indoor fan operation is being called for by the thermostat. If the thermostat is set in the continuous fan position the G terminal is energized at all times. If the thermostat is set in an automatic position the G terminal is energized simultaneously with the Y terminal based on the rise and fall of the temperature being sensed. If step 201 determines the Y terminal is not on and step 202 determines the G terminal is on then the logic proceeds to step 203 and results in both the indoor fan being energized and a flag being set. The logic then proceeds to defrost reset step 124.

If at step 202 the G terminal is not on the logic proceeds to step 204 where the flag set at step 203 is cleared. If at step 201 the Y terminal is energized the logic proceeds immediately to step 205 to determine whether the compressor is operating.

If step 205 determines that the compressor is operating the logic flow proceeds to step 206 to determine whether the fan delay has been accomplished. If the answer is yes, the fan delay has been accomplished, the logic then proceeds to step 208 and the indoor fan is turned on. If the fan delay is not completed then at step 206 the logic proceeds to step 207 to determine whether the strip heaters are energized. Fan delays are provided for the air conditioning system during startup to prevent air from being circulated until the heat exchanger achieves operating temperatures and during shutdown to realize the heat energy stored in the heat exchanger. If the strip heaters or other backup heaters are energized then at step 208 the fan is turned on. If the strip heaters are not on then the logic proceeds to defrost reset step 124. If, at step 205, it is determined that the compressor is not on then the logic flow proceeds to step 209.

Step 209 questions whether or not the W-2 output is energized indicating a need for second stage heat. If the answer is yes the logic flow proceeds to step 213 to determine whether or not the air conditioning system is an optimizer system. If it is not an optimizer system the logic proceeds to turn the fan on in step 214 and then proceeds to defrost reset step 124. If it is an optimizer system the logic flow proceeds to bypass step 214 and proceed directly to defrost reset step 124. An optimizer system is a combination heat pump and fuel fired furnace where the furnace is energized in response to W-2 and where the furnace has separate fan control means.

If at step 209 the W-2 output is not on the logic proceeds to step 210 to determine if the fan off delay has been completed. If the fan delay is not complete the logic proceeds to defrost reset 124. If the fan delay is complete the logic then proceeds to step 211 where it questions if the flag is set. If step 203 has set the flag and step 204 has not been energized to clear the flag then the answer to step 211 is yes and the logic proceeds to defrost reset step 124 and fan operation is not affected. If the answer to logic step 211 is no indicating the flag has been cleared via step 204 then the logic proceeds to step 212 and the fan is deenergized.

Referring more generally to the method of operation as indicated via flow chart 4, if the air conditioning unit thermostat senses a first stage heating need or a second stage cooling need (first stage cooling need being the reversing valve being switched to the cooling mode), in that event the logic proceeds to determine whether the compressor is operating or not. If the compressor is not operating notwithstanding the Y terminal being on then this indicates a fault of some sort or that the system is being maintained with the compressor off because of a built in delay or overload. In this condition the logic then proceeds to determine whether a second stage heating need or a third signal is being generated by the thermostat. If this third signal is being generated then the fan is turned on if it is not an optimizer system.

Upon startup and prior to a cooling or heating need being detected and hence prior to the Y terminal or first signal being generated, the logic proceeds to step 202 where it is determined whether or not the G terminal is on or a second signal is being generated. If the answer is that the Y terminal is off and the G terminal is on and then it is indicated that the thermostat has been set in the continuous fan position and the logic acts to set the flag to indicate the switch is set in the continuous fan position and acts to energize the fan. This flag remains set in this position until such time that both the Y terminal and the G terminal are off at which point the logic proceeds to step 204 to clear the flag. Hence, at all times the flag is either set indicating previous operation in the continuous fan mode or it is cleared indicating that the fan switch had been set in the automatic mode and that continuous fan operation is not desired.

If at step 205 it is determined that the compressor is operating then if the fan delay is achieved or if the strip heater is being utilized to supplement the compressor and the fan delay is complete then, in either event, the fan is energized to circulate air.

Step 211 is utilized to determine if the flag has been set when the Y terminal is on indicating a need for air conditioning and step 205 has determined the compressor is not energized. Under these conditions the Y and G terminals are both energized but the compressor is prevented from operating due to an overload or safety condition. In this event, the fan is turned on if it is not an optimizer system and the W-2 output is on. If the W-2 output is not on and the fan delay has been achieved then the fan is energized only if at step 211 it is determined the flag is set and the thermostat switch is then in the continuous on position. If the flag is not set then step 211 acts to discontinue the previous fan operation brought about when the Y and G terminal were both energized.

The invention has been described with reference to a particular embodiment thereof. It is to be understood by those skilled in the art that modifications and variations can be effected within the spirit and scope of the invention.

What is claimed is:

1. Apparatus for controlling the operation of an air conditioning system having a refrigeration circuit with a compressor, a microprocessor based control, a thermostat for sensing a need for heating or cooling including means for selectively operating an indoor fan continuously without regard to operation of the refrigeration circuit, said thermostat supplying a first signal to the microprocessor based control when fan operation is desired and a second signal to the microprocessor based control when compressor operation is desired which comprises:
    means for energizing the indoor fan in response to the first signal from the thermostat;
    means for energizing the compressor in response to the second signal from the thermostat;
    means for setting an indicator when the first signal is sensed and the second signal is not sensed;
    means for sensing if the thermostat is supplying a second signal and the compressor is not operating;
    means for detecting if the indicator is set; and
    means for operating the fan continuously if the means for sensing determines the compressor is not operating and the thermostat is supplying a second signal and the means for detecting determines that the indicator is set.

2. The apparatus as set forth in claim 1 and further comprising:
    means for clearing the indicator when neither the first signal nor the second signal is sensed.

3. The apparatus as set forth in claim 2 and further comprising means for de-energizing the indoor fan if the thermostat is supplying a second signal and the compressor is not operating and if the indicator is not set.

4. The apparatus as set forth in claim 3 wherein the air conditioning system includes supplemental heating means, wherein the thermostat supplies a third signal to the microprocessor based control when energization of the supplemental heating means is desired and further comprising:

means for determining if the thermostat is generating a third signal; and means for de-energizing the indoor fan if the thermostat is not generating a third signal and the indicator flag is not set.

5. The apparatus as set forth in claim 4 and further comprising:

means for energizing the indoor fan if the thermostat is generating a third signal.

6. Apparatus for appropriately energizing an indoor fan of an air conditioning system having a compressor, a microprocessor based control, means for supplying a first signal to the microprocessor based control upon a conditioning need requiring compressor operation being detected and means for supplying a second signal to the microprocessor based control when a need for indoor fan operation is detected, said second signal being generated whenever the first signal is generated and whenever a continuous fan mode of operation is selected which comprises:

first sensor means for sensing the absence or presence of the first and second signal;

means for setting an indicator and energizing the indoor fan if the presence of the second signal is sensed and the absence of the first signal is sensed by the first sensor means;

means for ascertaining if the compressor is operating;

means for energizing the indoor fan if the presence of the first signal is sensed by the first sensor means and the means for ascertaining ascertains that the compressor is operating;

means for detecting the presence of the indicator; and means for discontinuing operation of the indoor fan if the presence of the first signal is sensed by the first sensor means and the means for ascertaining ascertains that the compressor is not operating and the means for detecting does not reveal the presence of the indicator.

7. The apparatus as set forth in claim 6 and further comprising:

means for clearing the indicator if the absence of both the first and second signals is sensed by the first sensor means.

8. The apparatus as set forth in claim 6 including means for supplying a third signal to the microprocessor control upon a second stage heating need being detected and further comprising:

second sensor means for sensing the absence or presence of the third signal; and means for energizing the indoor fan if the presence of the first signal is sensed by the first sensor means, if the means for ascertaining ascertains that the compressor is not operating and if the presence of the third signal is sensed by the second sensor means.

* * * * *